US008508818B2

(12) United States Patent
Tohnai

(10) Patent No.: US 8,508,818 B2
(45) Date of Patent: Aug. 13, 2013

(54) IMAGE READING APPARATUS AND IMAGE FORMING APPARATUS

(75) Inventor: Yoshihiro Tohnai, Osaka (JP)

(73) Assignee: Kyocera Mita Corporation (JP)

( * ) Notice: Subject to any disclaimer, the term of this patent is extended or adjusted under 35 U.S.C. 154(b) by 364 days.

(21) Appl. No.: 12/892,267

(22) Filed: Sep. 28, 2010

(65) Prior Publication Data

US 2011/0075231 A1      Mar. 31, 2011

(30) Foreign Application Priority Data

Sep. 30, 2009  (JP) ................................. 2009-227055

(51) Int. Cl.
*H04N 1/04*          (2006.01)
(52) U.S. Cl.
USPC ........... 358/498; 358/474; 358/449; 399/374; 271/162
(58) Field of Classification Search
USPC ................ 358/498, 474, 1.15, 449, 488, 497, 358/496; 399/16, 374; 271/3.15, 162
See application file for complete search history.

(56) References Cited

U.S. PATENT DOCUMENTS

| | | | | | |
|---|---|---|---|---|---|
| 4,693,590 | A | * | 9/1987 | Umeda | 399/84 |
| 5,006,904 | A | * | 4/1991 | Matsuo et al. | 399/86 |
| 5,041,866 | A | * | 8/1991 | Imoto | 355/38 |
| 5,119,213 | A | * | 6/1992 | Graves et al. | 358/488 |
| 5,442,431 | A | * | 8/1995 | Fujimoto et al. | 399/367 |
| 5,513,017 | A | * | 4/1996 | Knodt et al. | 358/471 |
| 5,559,594 | A | * | 9/1996 | Ohhata et al. | 399/372 |
| 5,839,019 | A | * | 11/1998 | Ito | 399/45 |
| 6,038,424 | A | * | 3/2000 | Nakagawa | 399/367 |
| 7,061,637 | B2 | * | 6/2006 | Mochimaru et al. | 358/1.15 |
| 7,460,284 | B2 | * | 12/2008 | Hiromatsu | 358/518 |
| 7,460,825 | B2 | * | 12/2008 | Sawanaka et al. | 399/371 |
| 7,552,494 | B2 | * | 6/2009 | Peterson | 12/1 R |
| 7,826,105 | B2 | * | 11/2010 | Yamaguchi | 358/474 |
| 7,847,982 | B2 | * | 12/2010 | Mizumukai | 358/400 |
| 7,976,008 | B2 | * | 7/2011 | Kusama | 271/3.17 |
| 8,274,711 | B2 | * | 9/2012 | Hiro | 358/474 |
| 8,289,589 | B2 | * | 10/2012 | Matsushima | 358/498 |
| 2009/0237718 | A1 | | 9/2009 | Hiro | |

FOREIGN PATENT DOCUMENTS

| | | |
|---|---|---|
| JP | 63-129771 | 6/1988 |
| JP | 64-61739 | 3/1989 |
| JP | 200573116 | 3/2005 |

* cited by examiner

*Primary Examiner* — Negussie Worku
(74) *Attorney, Agent, or Firm* — Gerald E. Hespos; Michael J. Porco; Matthew T. Hespos

(57) ABSTRACT

An image reading apparatus includes a document feed unit that can adopt a first attitude to sandwich a document against a document table and a second attitude to release the document. An attitude detection unit detects the attitude of the document feed unit. A document detection unit detects whether a document is on a placement section of the document feed unit. An input acceptance unit accepts a selection input indicating whether a document on the document table is a read object document when attitudes of the document feed unit have been detected in a second-to-first sequence by the attitude detection unit when a document is detected on the document placement section. A control unit sets a document on the document table as the current read object, when the input acceptance unit accepts a selection input indicating that the document on the document table is to be a read object document.

10 Claims, 7 Drawing Sheets

IMAGE READING APPARATUS AND IMAGE FORMING APPARATUS

BACKGROUND OF THE INVENTION

1. Field of the Invention

The present invention relates to an image reading apparatus provided in a composite device or copying machine, or the like, and in particular to an image reading apparatus equipped with an automatic document feeder, and to an image forming apparatus having the same.

2. Description of the Related Art

Conventionally, there is an image reading apparatus equipped with an automatic document feeder (hereinafter, ADF) provided in a pressure plate which presses an original document onto a contact glass. In an image reading apparatus of this kind, for example, if the image reading apparatus is caused to perform a reading operation by a user B in an operating mode which does not use the ADF, while a user A has moved away from the image reading apparatus leaving a document set on the ADF, then the user B may fail to notice the document of user A which is set on the ADF. If user B is a person with a low line of sight, for instance, a person using a wheelchair, then he or she may not notice that user A's document is set on the ADF.

There are image reading apparatuses in which, even if there is a document that is placed on the contact glass, if a document is loaded on the ADF, then the document on the ADF is read rather than the document on contact glass. In this case, if the user B enters, for example, a fax transmission instruction in respect of his or her own document, without noticing the presence of user A's document which has been left on the ADF, then rather than performing a reading operation and fax transmission process in respect of user B's document, a reading operation and fax transmission are carried out in respect of user A's document.

On the other hand, an image forming apparatus of the following kind has been proposed. This image forming apparatus has a pressure plate mode in which a document placed on a document placement surface is copied by using an automatic document feeder which is attached openably and closably with respect to the main body of the image forming apparatus, as a pressure plate, and an automatic document feed mode in which a document placed on the document table of the automatic document feeder is copied by being fed automatically. If the automatic document feeder is open during an image forming operation, then it is recorded that this image forming operation was carried out in pressure plate mode. If the automatic document feed mode is selected after completing a series of image forming operations and when starting the next image forming operation, and if it has been recorded that the previous image forming operation was carried out in pressure plate mode, then if a document is present on the document placement surface, information indicating this fact is displayed.

Furthermore, a scanner such as the following has been proposed. This scanner comprises a pressure plate which presses an original document against a document glass, and an opening and closing detection device which detects the opening and closing of the pressure plate with respect to the document glass; an image of the document is read by scanning the document placed on the document glass with a light exposure scanner. After the end of a document image reading operation, if a prescribed period of time has elapsed since the opening and closing detection device detected a closed state of the pressure plate, then the presence or absence of a document is detected by scanning the exposure scanner, and if the presence of a document is revealed, then a warning indicating that a document has been left behind on the document glass is issued.

SUMMARY OF THE INVENTION

Employing the technical idea of displaying the fact that a document is present on the document placement surface and the contact glass in cases where a document is still set on the ADF, a composition can be conceived in which if a document is still set on the ADF, then this fact is displayed.

However, if the fact that a document is still set on the ADF is only displayed, then there is a possibility of a user overlooking this display and inputting a desired operation. Furthermore, even supposing that the user acknowledges this display, the user is required to remove another person's document, which is loaded on the ADF, from the ADF, look for a separate location where it can be left, and then move the document left on the ADF, to that location. These tasks are troublesome for a person having a low line of sight, such as a user sitting in a wheelchair, for example.

It is an object of the present invention to provide an image reading apparatus whereby, when reading in a document placed on a document table, even if a document is set on an ADF, reading of the document set on the ADF is avoided and the document placed on the document table can be read.

The image reading apparatus relating to one aspect of the present invention which achieves the aforementioned object is an image reading apparatus including: a document table on which a document is placed; a document reading unit which reads an image of a document; a document feed unit which has a document placement section on which a document subjected to a reading operation by the document reading unit is placed, and which is configured so as to be able to adopt a first attitude of sandwiching the document between the document placement surface of the document table and the document feed unit, and a second attitude in which the state of sandwiching the document between the document placement surface of the document table and the document feed unit is released; an attitude detection unit which detects whether the attitude of the document feed unit is the first attitude or the second attitude; a document presence/absence detection unit which detects whether or not a document has been placed on the document placement section of the document feed unit; an operation control unit which has a first control mode for controlling the operation of respective units including the document reading unit in order to read an image of a document placed on the document placement surface of the document table, and a second control mode for controlling the operation of respective units including the document reading unit in order to read an image of a document placed on the document placement section of the document feed unit; and an input acceptance unit which accepts a setting input for setting, as a read object document, either a document placed on the document placement surface of the document table or a document placed on the document placement section of the document feed unit when attitudes of the document feed unit are detected in the sequence of the second attitude followed by the first attitude by the attitude detection unit, in a state where detection is made by the document presence/absence detection unit that a document is placed on the document placement section of the document feed unit, wherein the operation control unit sets a document placed on the document placement surface of the document table as the current read object, when the input acceptance unit accepts an input indicating that the document placed on the document placement surface of the document table is to be set as a read object document.

The image reading apparatus relating to a further aspect of the present invention which achieves the aforementioned object is an image reading apparatus including: a document table on which a document is placed; a document reading unit which reads an image of a document; a document feed unit which has a document placement section on which a document subjected to a reading operation by the document reading unit is placed, and which is configured so as to be able to adopt a first attitude of sandwiching a document between the document placement surface of the document table and the document feed unit, and a second attitude in which the state of sandwiching a document between the document placement surface of the document table and the document feed unit is released; an attitude detection unit which detects whether the attitude of the document feed unit is the first attitude or the second attitude; a document presence/absence detection unit which detects whether or not a document has been placed on the document placement section of the document feed unit; an operating unit for inputting an instruction for the execution of a read operation by the document reading unit; and an operation control unit having a first control mode for controlling the operation of respective units including the document reading unit in order to read an image of a document placed on the document placement surface of the document table, and a second control mode for controlling the operation of respective units including the document reading unit in order to read an image of a document placed on the document placement section of the document feed unit, wherein the operation control unit sets as the current read object a document placed on the document placement surface of the document table when attitudes of the document feed unit are detected in the sequence of the second attitude followed by the first attitude by the attitude detection unit, in a state where detection is made by the document presence/absence detection unit that a document is placed on the document placement section of the document feed unit, and when input of the execution instruction is accepted by the operating unit, the operation control unit controls the operation of the respective units including the document reading unit in the first control mode, and causes the document placed on the document placement section of the document feed unit to be output to a prescribed output position.

The image reading apparatus relating to yet a further aspect of the present invention which achieves the aforementioned object is an image reading apparatus including: a document table on which a document is placed; a document reading unit which reads an image of a document; a document feed unit which has a document placement section on which a document subjected to a reading operation by the document reading unit is placed, and which is configured so as to be able to adopt a first attitude of sandwiching a document between the document table and the document feed unit, and a second attitude in which the state of sandwiching a document between the document table and the document feed unit is released; an attitude detection unit which detects whether the attitude of the document feed unit is the first attitude or the second attitude; a document presence/absence detection unit which detects whether or not a document has been placed on the document placement section of the document feed unit; an operation control unit having a first control mode for controlling the operation of respective units including the document reading unit in order to read an image of a document placed on the document table, and a second control mode for controlling the operation of respective units including the document reading unit in order to read an image of a document placed on the document placement section of the document feed unit; and an input acceptance unit which accepts a selection input indicating whether or not to set a document placed on the document table as a read object document, when attitudes of the document feed unit have been detected in the sequence of the second attitude followed by the first attitude by the attitude detection unit, in a state where detection is made by the document presence/absence detection unit that a document is placed on the document placement section of the document feed unit, wherein the operation control unit sets a document placed on the document table as the current read object, if the input acceptance unit accepts a selection input indicating that the document placed on the document table is to be set as a read object document.

DETAILED DESCRIPTION OF THE PREFERRED EMBODIMENTS

Figure 1:
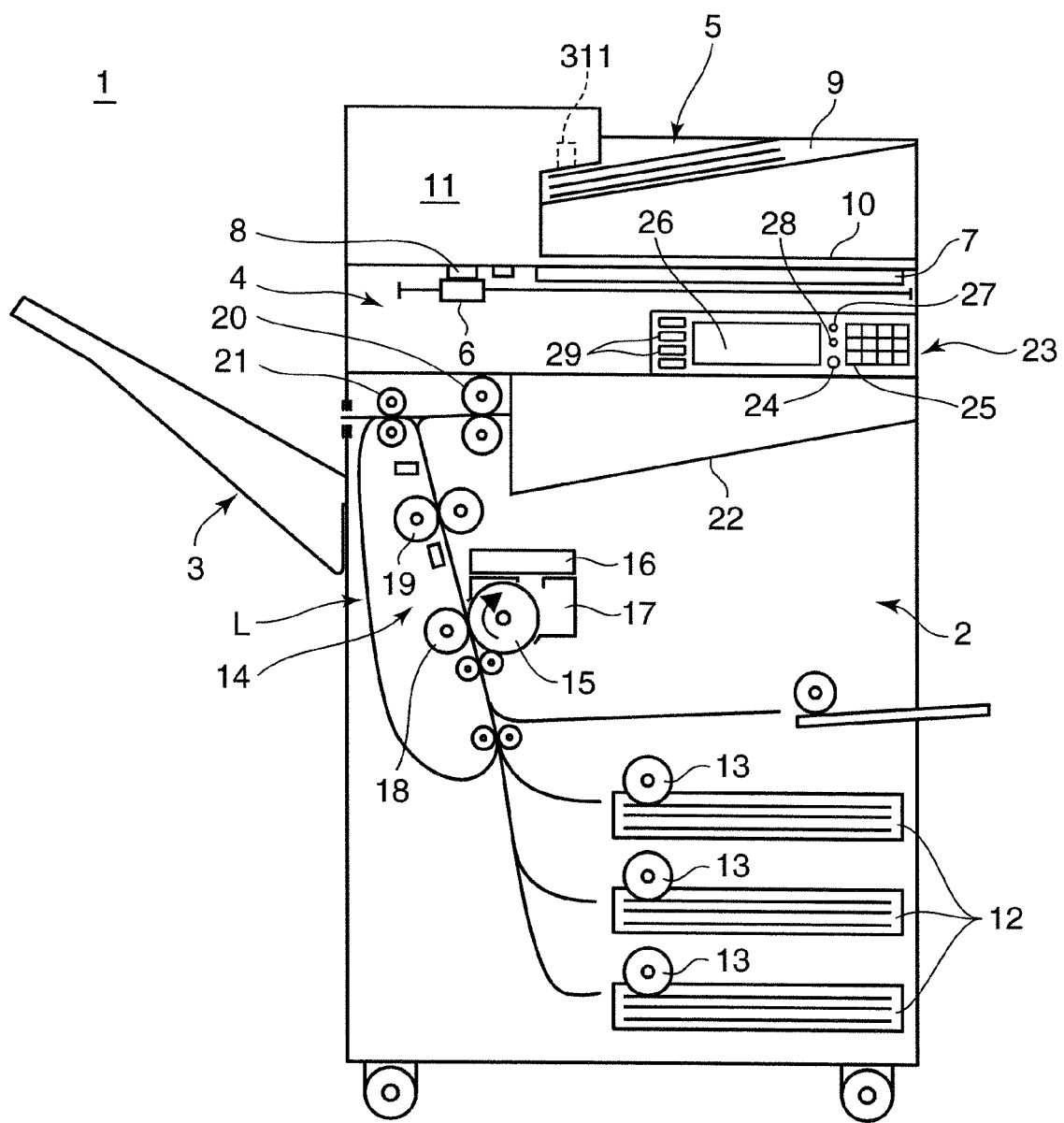
FIG. 1 is a side view diagram showing the internal composition of a composite machine which is one embodiment of an image reading apparatus relating to the present invention.

Below, embodiments of the image reading apparatus relating to the present invention are described with reference to the drawings. FIG. 1 is a side view diagram showing the internal composition of a composite machine which is one embodiment of an image reading apparatus relating to the present invention.

As shown in FIG. 1, the composite machine 1 comprises functions for executing the following modes: copy mode, printer mode, scanner mode and facsimile mode. The composite machine 1 comprises a main body section 2, a stack tray 3 which is disposed on the left-hand side of the main body section 2, a document reading unit 4 disposed above the main body section 2, and a document feed unit 5 disposed above the document reading unit 4.

The document reading unit 4 comprises a scanner unit 6 consisting of CCD (Charge Coupled Device) sensors or exposure lamps, a document table 7 made of a transparent member, such as glass, and a document reading slit 8. The scanner unit 6 is composed movably by means of a drive unit (not illustrated), and when reading a document that is placed on the document table 7, the scanner unit 6 is moved along the document surface in a position facing the document table 7, and the image data acquired by scanning over the original document image is output by the scanner unit 6 to the image processing unit (not illustrated). Furthermore, when a document fed by the document feed unit 5 is moved to a position facing the document reading slit 8, the document image is acquired via the document reading slit 8 in synchronism with a conveyance operation for the document by the document feed unit 5, and the corresponding image data is output to the image processing unit.

The document feed unit 5 corresponds to an ADF, and comprises a document placement section 9 for loading a document, a document output section 10 for outputting a document after image reading, and a document conveyance mechanism 11 consisting of paper feed rollers (not illustrated) and conveyance rollers (not illustrated), and the like, for paying out the document loaded on the document placement section 9, one sheet at a time, conveying the document to a position facing the document reading slit 8, and then outputting the document to the document output section 10. The document conveyance mechanism 11 comprises a paper reversal mechanism (not illustrated) for reversing the front/rear surfaces of the document and conveying the document back to a position facing the document reading slit 8, and hence a double-sided image of the document can be read by the scanner unit 6 via the document reading slit 8.

The document feed unit 5 is provided rotatably with respect to the main body section 2, in such a manner that the front face side thereof is movable in the upward direction. By moving the front face side of the document feed unit 5 upwards to open the upper surface of the document table 7, an operator becomes able to place a document for reading, for example, an open book, on the upper surface of the document table 7.

The main body section 2 comprises a plurality of paper feed cassettes 12, a paper feed roller 13 which pays out recording paper one sheet at a time from the paper feed cassettes 12 and conveys the paper to an image forming unit 14 which is described below, and an image forming unit 14 which forms an image on the recording paper conveyed from the paper feed cassettes 12.

The image forming unit 14 comprises: a light scanning apparatus 16 which exposes a photosensitive drum 15 by outputting laser light, or the like, on the basis of image data acquired by the scanner unit 6, or the like, a developing unit 17 which forms an image by converting an electrostatic latent image formed on the surface of the photosensitive drum 15 into an actual image, a transfer unit 18 which transfers the image formed on the photosensitive drum 15, onto recording paper, a fixing unit 19 which fixes the image onto the recording paper by heating the recording paper onto which the image has been transferred, and conveyance rollers 20, 21, and the like, provided in a paper conveyance path inside the image forming unit 14, for conveying the recording paper to the stack tray 3 or the output tray 22.

In the case of forming an image on both sides of the recording paper, after forming an image on one surface of the recording paper in the image forming unit 14, the recording paper is in a state of being nipped by the conveyance roller 20 on the output tray 22 side. In this state, the conveyance roller 20 reverses and the recording paper is switched back and conveyed again along the paper conveyance path L to the region upstream of the image forming unit 14, whereupon an image is formed on the other surface of the image forming unit 14 and the recording paper is then output to the stack tray 3 or output tray 22.

An operating unit 23 is provided in the front portion of the composite machine 1. The operating unit 23 comprises a start key 24 for the user to input a print instruction, a keypad 25 for inputting the number of copies, etc., a display unit 26 consisting of a liquid crystal display, or the like, which displays operating guide information, and the like, for various copying operations, and has a touch panel function for inputting various related settings, a reset key 27 for resetting the contents set on the display unit 26, and the like, a stop key 28 for halting a currently executed printing (image formation) operation, and a function switch key 29 for switching between a copy function, a printer function, a scanner function and a facsimile function.

Figure 2:
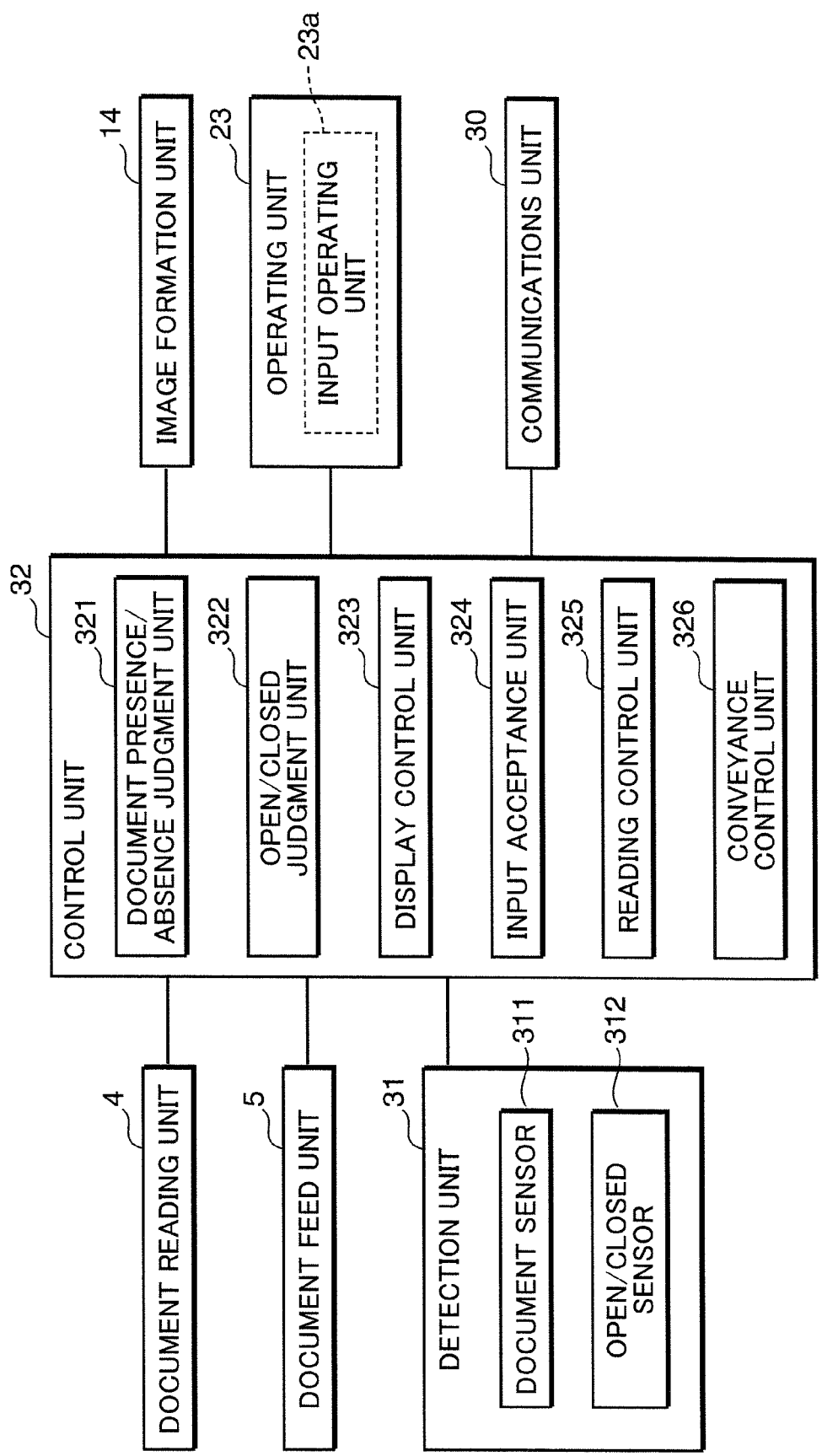
FIG. 2 is a block diagram showing the electrical composition of the composite machine.

FIG. 2 is a block diagram showing the electrical composition of the composite machine 1. Parts of the composition which are the same as that shown in FIG. 1 are labeled with the same reference numerals and description thereof is omitted.

As shown in FIG. 2, the composite machine 1 comprises a communications unit 30, a detection unit 31 and a control unit 32, in addition to the document reading unit 4, the document feed unit 5, the image forming unit 14 and the operating unit 23 described above. The communications unit 30 communicates data of various kinds with a prescribed external device X (not illustrated), such as a personal computer, or the like.

The detection unit 31 comprises a document sensor 311 for detecting whether or not a document has been placed on the document placement section 9, and an open/closed sensor 312 for detecting whether or not the document feed unit 5 has been opened and closed with respect to main body section 2.

The document sensor 311 comprises a photoemitter and photoreceptor pair, for example, and detects whether or not a document is placed on the document placement section 9 by using light as the detection medium. More specifically, the document sensor 311 outputs light from the photoemitter. If a document is placed on the document placement section 9, then the light is reflected by the document. If a document is not placed on the document placement section 9, then the light is not reflected by the document. If light is reflected by the document, then this reflected light is received by the photoreceptor. Upon receiving reflected light, the photoreceptor outputs a reception signal to the control unit 32.

Figure 3:
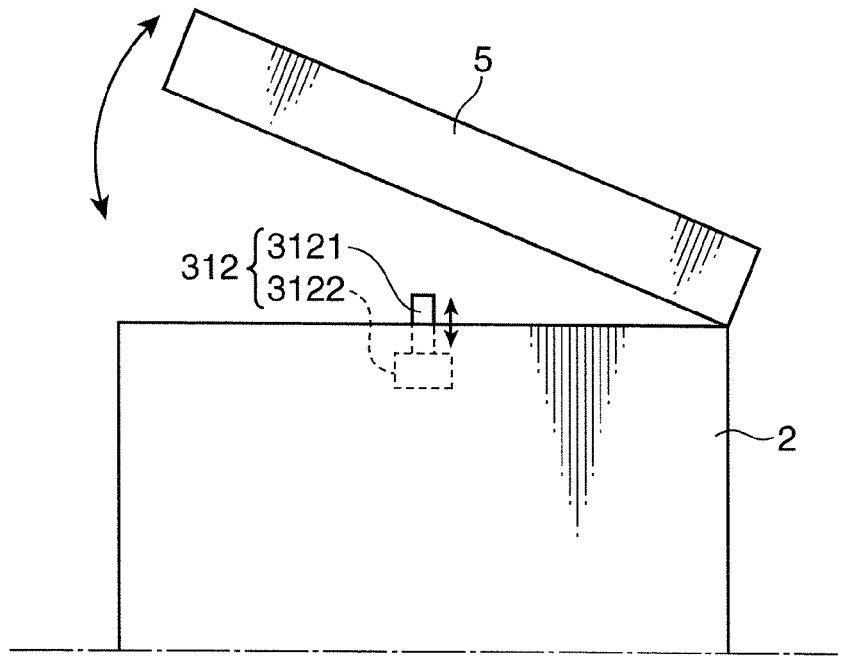
FIG. 3 is a diagram showing the external appearance of an open/closed sensor.

The open/closed sensor 312 comprises a button 3121 disposed so as to be able to project and retract at a suitable position on the upper surface of the main body section 2, and a switch 3122 disposed inside the main body section 2, as shown in FIG. 3 for example. When an operation of closing the document feed unit 5 is performed and the angle of inclination of the document feed unit 5 with respect to the document placement surface (table surface) of the document table 7 has become smaller than a prescribed angle, the document feed unit 5 presses the button 3121 downwards and the button 3121 moves downwards. The switch 3122 turns on when the button 3121 descends to a position lower than a prescribed height, and outputs an on signal to the control unit 32.

The control unit 32 comprises a RAM (Random Access Memory) having a function for temporarily storing data and a function as a work area, a flash memory which previously stores a program, and a CPU which reads out and executes the program, and the like, from the flash memory, and is composed in such a manner that data is exchanged between the CPU, RAM and flash memory via a data bus. The CPU carries out processing corresponding to the contents of a program stored in the flash memory by suitably executing the program.

The control unit 32 according to the present embodiment comprises the functions of a document presence/absence judgment unit 321, an open/closed judgment unit 322, a display control unit 323, an input acceptance unit 324, a reading control unit 325 and a conveyance control unit 326.

The document presence/absence judgment unit 321 judges whether or not there is a document on the document feed unit 5, on the basis of the detection signal output from the document sensor 311. The open/closed judgment unit 322 judges whether the document feed unit 5 is open or closed, on the basis of the detection signal output from the open/closed sensor 312. In other words, an attitude detection unit includes the open/closed judgment unit 322 and the open/closed sensor 312. The attitude detection unit detects whether the attitude of the document feed unit 5 is the first attitude or the second attitude. The first attitude means sandwiching the document between a document placement surface of the document table 7 and the document feed unit 5. The second attitude means that the state of sandwiching the document between the document placement surface of the document table 7 and the document feed unit 5 is released.

If the display control unit 323 has judged that a document has been placed on the document placement section 9, by means of the document presence/absence judgment unit 321, and has judged that the document feed unit 5 has been opened and closed, by means of the open/closed judgment unit 322, then a read object setting screen G is displayed on the display unit 26. The read object setting screen G is a request screen whereby the user can make an input to set the read object either to a document placed on the document feed unit 5, or to a document placed on the document table 7.

Figure 4:
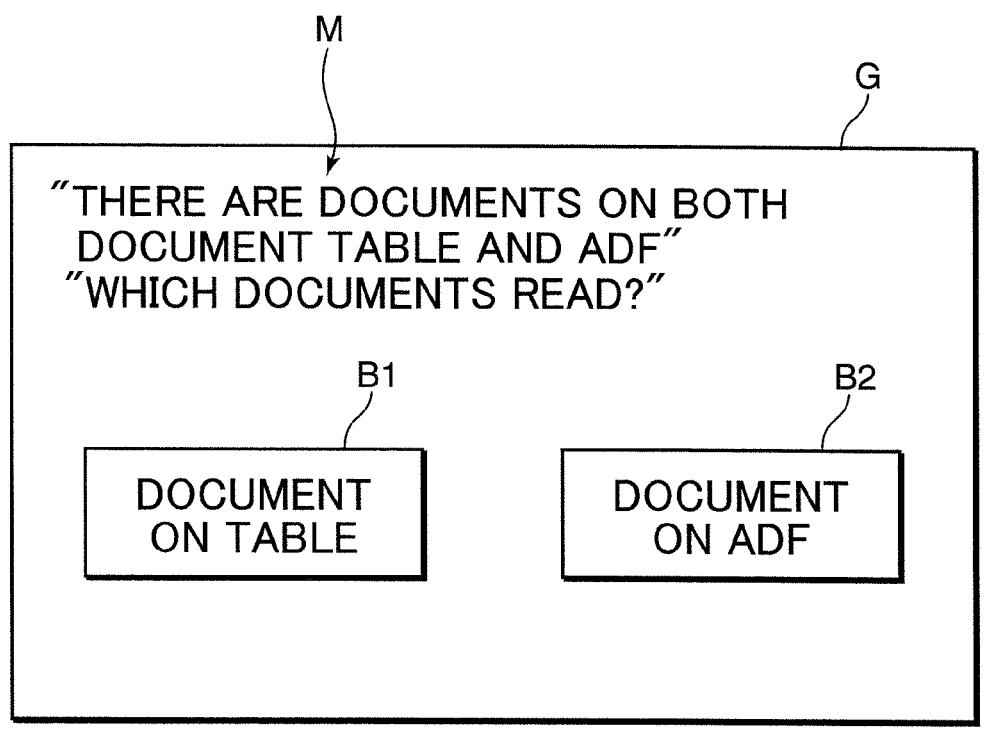
FIG. 4 is a diagram showing one example of a read object setting screen.

In the composite machine 1 according to the present embodiment, after the document feed unit 5 which was closed has been opened, it is considered that a document has been placed on the document table 7. The user is able to choose whether the document set on the document table 7 is to be the current read object or whether the document set on the document feed unit 5 is to be the current read object. FIG. 4 shows one example of a read object setting screen G.

The read object setting screen G shown in FIG. 4 displays: the fact that documents are loaded on both the document feed unit 5 and the document table 7, a message M inviting the user to set either the document on the document feed unit 5 or the document on the document table 7 as a read object, a button B1 for making an input to set the document on the document table 7 as the read object and a button B2 for making an input to set the document on the document feed unit 5 (ADF) as the read object.

The input acceptance unit 324 accepts the operation of the button B1 or the button B2.

The reading control unit 325 controls the read operation performed by the document reading unit 4. In the present embodiment, when an operation in respect of button B1 has been accepted by the input acceptance unit 324 on the read object setting screen G, the document on the document table 7 is set as the current read object, and when the start key 24 is operated, the document reading unit 4 is caused to perform a reading operation in respect of the document on the document table 7.

On the other hand, if the operation of the button B2 is accepted by the input acceptance unit 324, then the reading control unit 325 sets the document on the document feed unit 5 as the current read object and when the start key 24 is operated, causes the document reading unit 4 to perform a reading operation in respect of the document on the document feed unit 5.

The conveyance control unit 326 controls the conveyance operation by the members and mechanism relating to paper conveyance, such as the document conveyance mechanism 11, the conveyance rollers 13, 20, 21, and the like. In the present embodiment, when an operation in relation to button B2 is accepted by the input acceptance unit 324, if the start key 24 is operated, then the respective sections of the document feed unit 5 are caused to perform a conveyance operation for the document on the document feed unit 5. The reading control unit 325 and the conveyance control unit 326 constitute an operation control unit.

Figure 5:
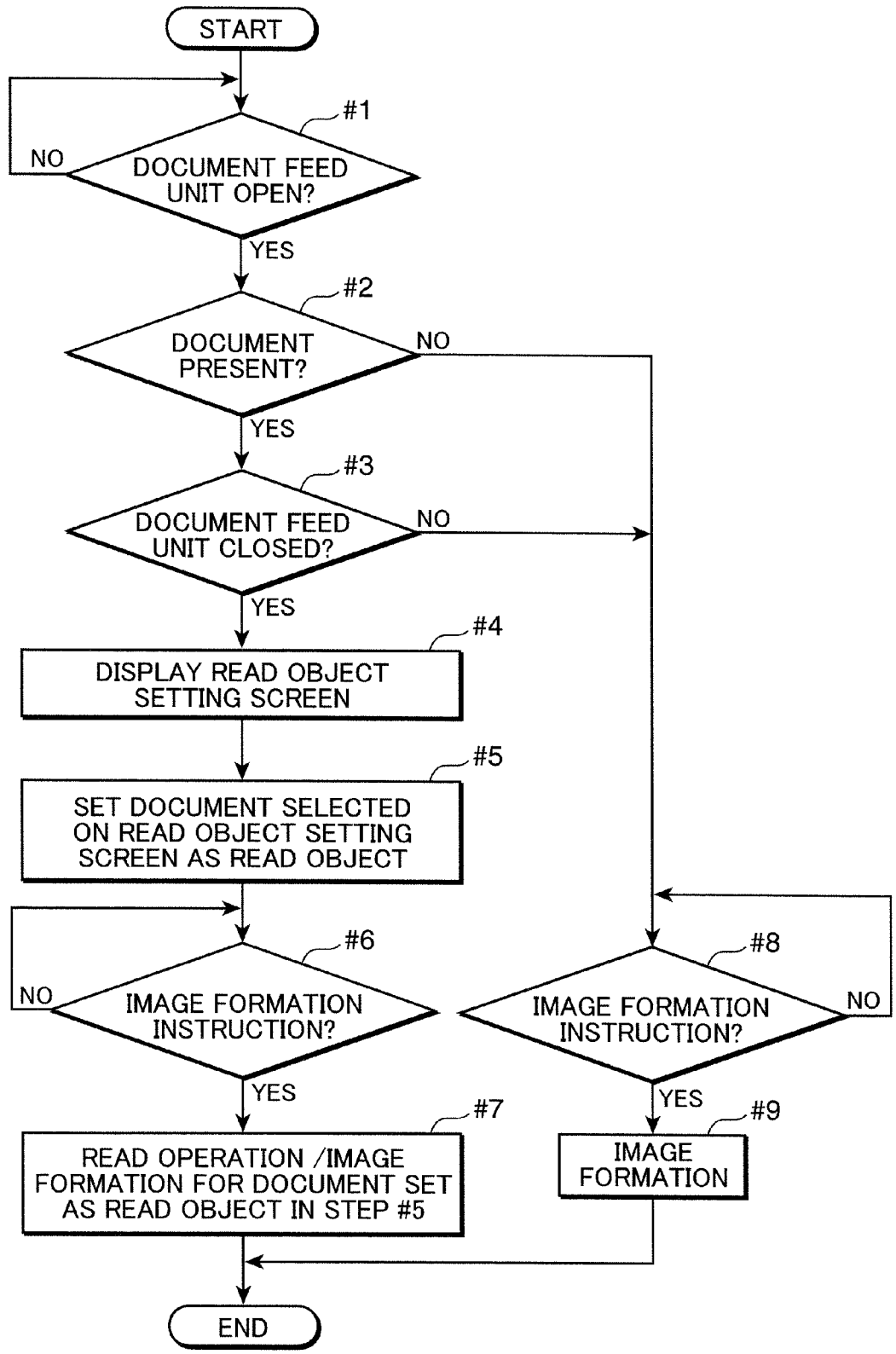
FIG. 5 is a flowchart showing a reading process of the control unit.

FIG. 5 is a flowchart showing a reading process of the control unit 32.

As shown in FIG. 5, if the open/closed judgment unit 322 judges that the document feed unit 5 is open (YES at step #1), then the document presence/absence judgment unit 321 judges whether or not there is a document on the document feed unit 5, on the basis of a detection signal output from the document sensor 311 (step #2). If the document presence/absence judgment unit 321 judges that a document is present on the document feed unit 5 (YES in step #2), then the open/closed judgment unit 322 judges whether or not the document feed unit 5 is closed (step #3).

If the open/closed judgment unit 322 judges that the document feed unit 5 is closed (YES at step #3), then the display control unit 323 causes the display unit 26 to display the read object setting screen G shown in FIG. 4, for example (step #4). If one of the buttons B1 and B2 is operated on this read object setting screen G, then the document corresponding to that button is set as the read object (step #5). In other words, if the button B1 has been operated on the read object setting screen G, then the reading control unit 325 sets the document on the document table 7 as the current read object, and if the button B2 has been operated, then the reading control unit 325 sets the document on the document feed unit 5 as the current read object.

The control unit 32 (the reading control unit 325 and the conveyance control unit 326, and the like) judges whether or not an image formation instruction has been accepted due to the start key 24 being pressed (step #6), and if there is an image formation instruction (YES at step #6), causes the document reading unit 4 and the image formation unit 14 to carry out a reading operation and an image formation operation with respect to the document that was set as the read object in step #5 (step #7). In other words, if button B1 was operated at step #5, then the control unit 32 (the reading control unit 325 and the conveyance control unit 326, and the like) cause the document reading unit 4 and the image formation unit 14 to perform a reading operation and an image formation operation in respect of the document on the document table 7, which corresponds to the button B1, whereas if button B2 was operated, then the control unit 32 causes the document reading unit 4 and the image formation unit 14 to carry out a reading operation and an image formation operation in respect of the document on the document feed unit 5, which corresponds to button B2.

In step #2, if the document presence/absence judgment unit 321 judges that there is no document on the document feed unit 5 (NO at step #2), then the procedure advances to the processing in step #8. Furthermore, if the document presence/absence judgment unit 321 judges that a document is present on the document feed unit 5 (YES at step #2), and the open/closed judgment unit 322 judges that the document feed unit 5 is not closed (NO at step #3), then the procedure advances to the processing in step #8. Step #8 is a process for carrying out a reading operation and an image formation operation with respect to a document placed on the document table 7 (for example, a book in an open state), when the document feed unit 5 is in an open state. If there is an image formation instruction (YES at step #8), then the control unit 32 causes the document reading unit 4 and the image forming unit 14 to carry out a reading operation and image formation operation for the document placed on the document table 7 (step #9).

As described above, in the present embodiment, when the document feed unit 5 is opened and closed (in other words, when the attitude of the document feed unit 5 is detected in the sequence of a second attitude (YES at step #1), followed by a first attitude (YES at step #3), or stated alternatively, if it is detected that the attitude of the document feed unit 5 is set to the first attitude again after passing through the second attitude, then it is considered that a document has been placed on the document table 7. In a case where a document is placed on both the document feed unit 5 and the document table 7, the user selects which document, of the document placed on the document feed unit 5 and the document placed on the document table 7, is to be taken as the current read object. Consequently, when reading in a document placed on the document table 7, even if a document has been set on the document feed unit 5 (ADF), reading of the document set on this ADF is avoided and the document placed on the document table 7 can be read. According to the present embodiment, compared to a composition in which a display is simply provided indicating that a document is still placed on the document feed unit 5, as in the prior art, it is possible to make the user more fully aware of the document that is the current read object, and hence a reading operation for the document set on the document feed unit 5 can be prevented or suppressed more reliably.

Moreover, the user has to perform neither the task of removing another person's document which is on the document feed unit 5, nor the task of searching for another location to leave such document, which was left on the document feed unit 5, and then placing it in the location found. In particular, it is possible to improve usability for people having a low line of sight, such as a user sitting in a wheel chair.

From the above, it is possible to avoid mistakenly carrying out a reading operation for a document on the document feed unit 5, more reliably, while avoiding troublesome tasks for the user as far as possible.

There are the following first and second modifications of the present embodiment.

In the present embodiment, if it is judged that a document is placed on both the document feed unit 5 and the document table 7, the user selects which document, of the document placed on the document feed unit 5 and the document placed on the document table 7, is to be taken as the current read object. In the first modification example, the user is not able to make a selection of this kind. In the first modification, when the start key 24 is operated, the reading control unit 325 causes the document reading unit 4 to start a reading operation for the document on the document table 7. In parallel with the reading operation, the conveyance control unit 326 causes the document conveyance mechanism 11 to perform an operation of moving the document placed on the document placement section 9 of the document feed unit 5 to a different location, in this case, an operation of outputting the document to the document output section 10.

Figure 6:
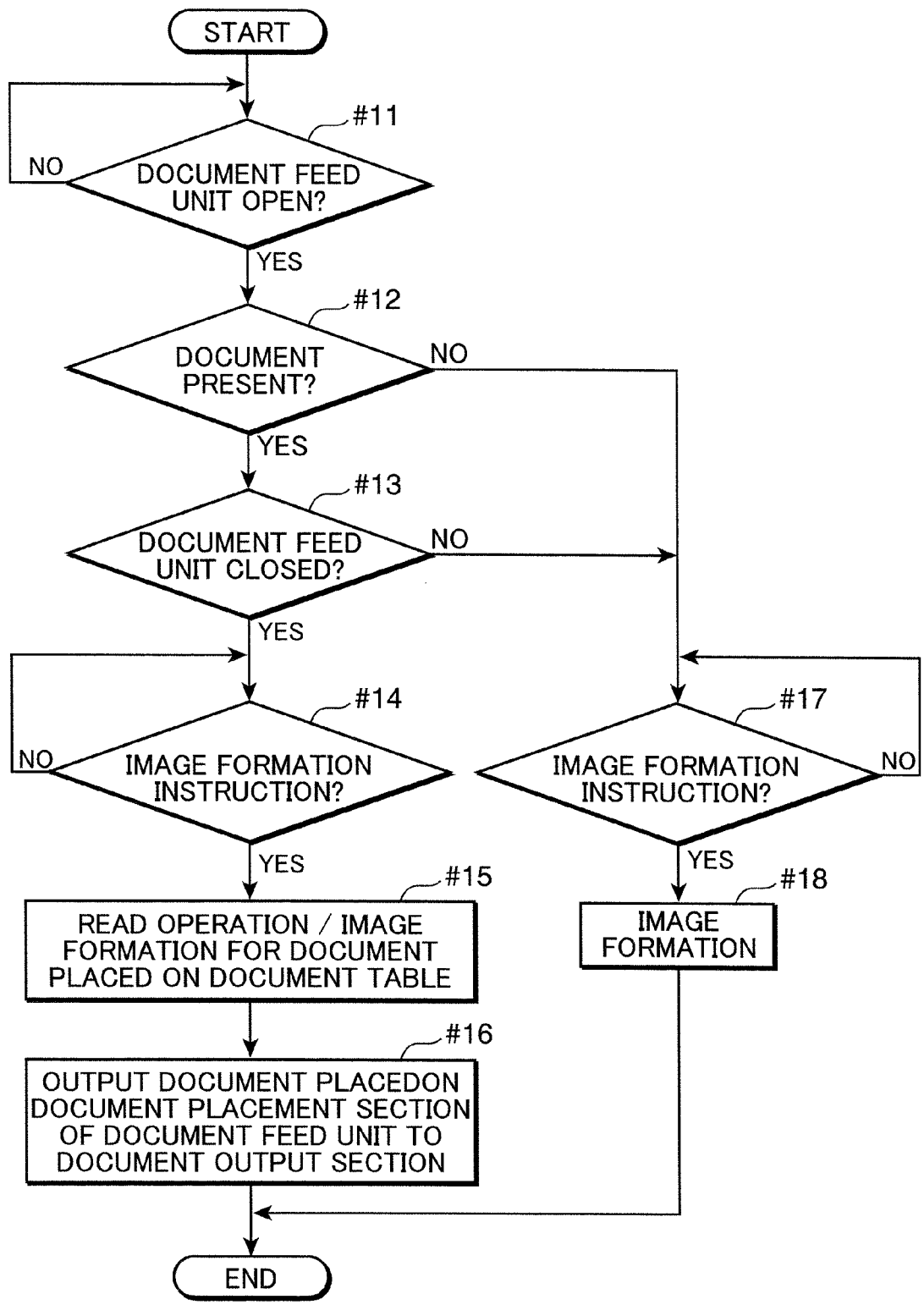
FIG. 6 is a flowchart showing a reading process of the control unit according to a first modification example.

FIG. 6 is a flowchart showing a reading process of the control unit 32 according to the first modification example.

As shown in FIG. 6, if the open/closed judgment unit 322 judges that the document feed unit 5 is open (YES at step #11), then the document presence/absence judgment unit 321 judges whether or not there is a document on the document feed unit 5, on the basis of a detection signal output from the document sensor 311 (step #12). If the document presence/absence judgment unit 321 judges that a document is present on the document feed unit 5 (YES in step #12), then the open/closed judgment unit 322 judges whether or not the document feed unit 5 is closed (step #13).

If the open/closed judgment unit 322 judges that the document feed unit 5 is closed (YES at step #13), then the control unit 52 (the reading control unit 325 and the conveyance control unit 326, and the like) wait at standby until there is an image formation instruction (NO at step #14), and when there is an image formation instruction (YES at step #14), the document reading unit 4 and the image formation unit 14 are caused to perform a reading operation and image formation operation in respect of the document on the document table 7 (step #15), and furthermore the document conveyance mechanism 11 is caused to carry out an operation of outputting the document placed on the document placement section 9 of the document feed unit 5, to the document output section 10 (step #16).

In step #12, if the document presence/absence judgment unit 321 judges that there is no document on the document feed unit 5 (NO at step #12), then the procedure advances to the processing in step #17. Furthermore, in step #12, if the document presence/absence judgment unit 321 has judged that a document is present on the document feed unit 5 (YES at step #12), but the open/closed judgment unit 322 judges that the document feed unit 5 is not closed (NO at step #13), then the procedure advances to the processing in step #17. If there is an image formation instruction (YES in step #17), then processing similar to the present embodiment (the processing in steps #8 and #9 of the flowchart shown in FIG. 5) is carried out (steps #17 and #18).

In the first modification example, similarly to the embodiment, when reading in a document placed on the document table 7, even if a document has been set on the document feed unit 5 (ADF), reading of the document set on this feed unit 5 is avoided and the document placed on the document table 7 can be read. In the first modification example, the document placed on the document placement section 9 of the document feed unit 5 is moved so as to avoid an incorrect reading operation, and therefore it is possible reliably to prevent a reading operation from being carried out mistakenly in respect of a document placed on the document placement section 9 of the document feed unit 5.

Furthermore, in the first modification example, similarly to the embodiment, the user has to perform neither the task of removing another person's document which is on the document feed unit 5, nor the task of searching for another location to leave such document, which was left on the document feed unit 5 and then placing it in the location found. In particular, it is possible to improve usability for people having a low line of sight, such as a user sitting in a wheel chair.

From the above, according to the first modification example, it is possible to avoid mistakenly carrying out a reading operation for a document on the document feed unit 5, more reliably, while avoiding troublesome tasks for the user as far as possible.

Furthermore, according to the first modification example, it is possible to avoid the task of the user being made to select either the document placed on the document feed unit 5 or the document placed on the document table 7, as the current read object, as performed in the embodiment.

Next, a second modification example will be described. In the embodiment, as shown in FIG. 4, the read object is selected from between a document on the document feed unit 5 and a document on the document table 7. In the second modification example, an input is made for selecting whether or not to set the document on the document table 7 as the read object, and it is not possible to select the document on the document feed unit 5 as the read object.

In the second modification example, the message M is: "There are documents on both document table and ADF. Read document on table?" Button B1 contains the word "Yes" and functions as a button for inputting a selection to read the document on the document table 7. Button B2 contains the word "No" and functions as a button for inputting a selection not to read the document on the document table 7. If button B2 is operated, then the read object setting screen G switches to the initial screen of the composite machine 1.

In the second modification example, the input acceptance unit 324 shown in FIG. 2 accepts a selection input when the attitude of the document feed unit 5 is detected in the sequence of second attitude followed by first attitude by the attitude detection unit (the open/closed sensor 312 and the open/closed judgment unit 322), in other words, if the document feed unit 5 is opened and closed, in a state where the document presence/absence detection unit (the document sensor 311 and the document presence/absence judgment unit 321) is detecting that a document is present on the document placement section 9 of the document feed unit 5. The selection input is an input selecting whether or not to set the document placed on the document table 7 as the read object.

The operation control unit (read control unit 325 and the conveyance control unit 326, and the like) has a first control mode which controls the operation of the respective units including the document reading unit 4 in order to read an image of a document placed on the document table 7, and a second control mode which controls the operation of the respective units including the document reading unit 4 in order to read an image of a document placed on the document placement section 9 of the document feed unit 5.

If the input acceptance unit 324 accepts a selection input indicating that the document placed on the document table 7 is to be set as the read object document, then the operation control unit sets the document placed on the document table 7 as the current read object. The second modification example comprises an operating unit 23 for inputting an instruction for executing a read operation by the document reading unit 4, and the operation control unit controls the operation of the respective units including the document reading unit 4 in the first control mode, if the input of an execution instruction is accepted by the operating unit 23, after the document placed on the document table 7 is set as the current read object.

As described above, according to this second modification example, similarly to the embodiment and the first modification example when reading in a document placed on the document table 7, even if a document has been set on the document feed unit 5 (ADF), reading of the document set on this feed unit 5 is avoided and the document placed on the document table 7 can be read.

The second modification example has the following characteristic features.

(1) If the input of an execution instruction is accepted by the operating unit 23 after a document placed on the document table 7 has been set as the current read object, then the document placed on the document placement section 9 of the document feed unit 5 is output to the document output unit 10 (the prescribed output position).

Figure 7:
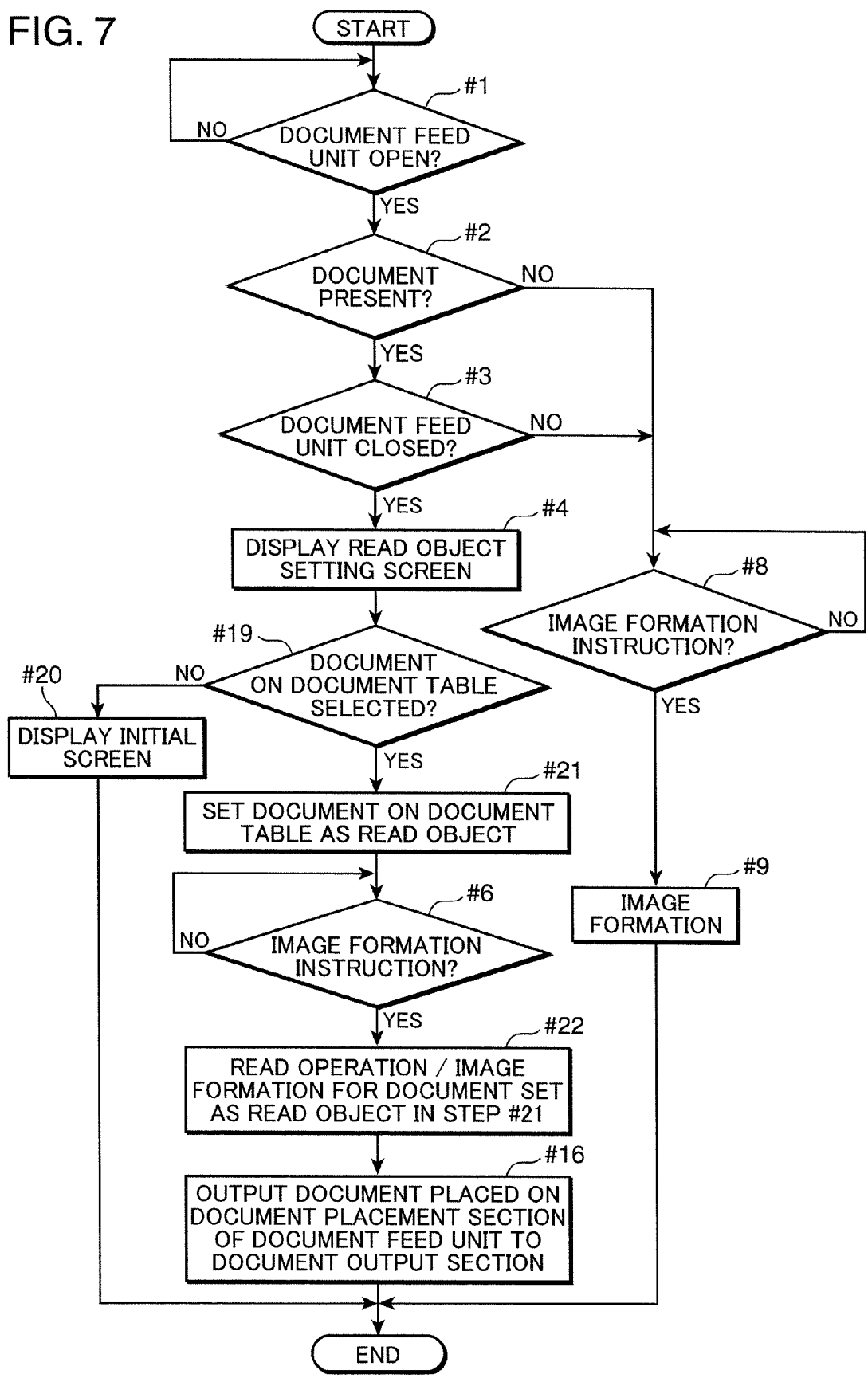
FIG. 7 is a flowchart showing a reading process of the control unit in relation to the characteristic feature (1) of a second modification example.

The characteristic feature (1) combines the characteristic features of the first modification example with the second modification example. FIG. 7 is a flowchart for describing the characteristic feature (1). Steps which are the same as the steps described in FIG. 5 and FIG. 6 are labeled with the same reference numerals and description thereof is omitted. In the second modification example, in step #4, as stated previously, the message M is: "There are documents on both document table and ADF. Read document on table?" If the button B2 is operated and reading of the document on the document table 7 is not selected (NO at step #19), then the display control unit 323 causes the display unit 26 to display an initial screen of the composite machine 1 (step #20). The reading process of the control unit 32 according to the second modification example then terminates.

If the button B1 is operated and reading of the document on the document table 7 is selected (YES at step #19), then the display control unit 325 sets the document on the document table 7 as the current read object (step #21). Thereupon, if there is an image formation instruction (YES at step #6), then the control unit 32 causes the document reading unit 4 and the image forming unit 14 to carry out a reading operation and image formation operation in respect of the document on the document table 7 (step #22). Step #16 which was described in the first embodiment is then carried out, and the reading process of the control unit 32 according to the second modification example terminates.

According to characteristic feature (1), since the document placed on the document placement section 9 of the document feed unit 5 is output to the document output section 10, then it is possible to achieve a state where no document is placed on the document placement section 9 of the document feed unit 5. Consequently, when the user continues by placing a subsequent document on the document table 7, the read object setting screen G is not displayed, and therefore it is possible to omit the selection input.

Figure 8:
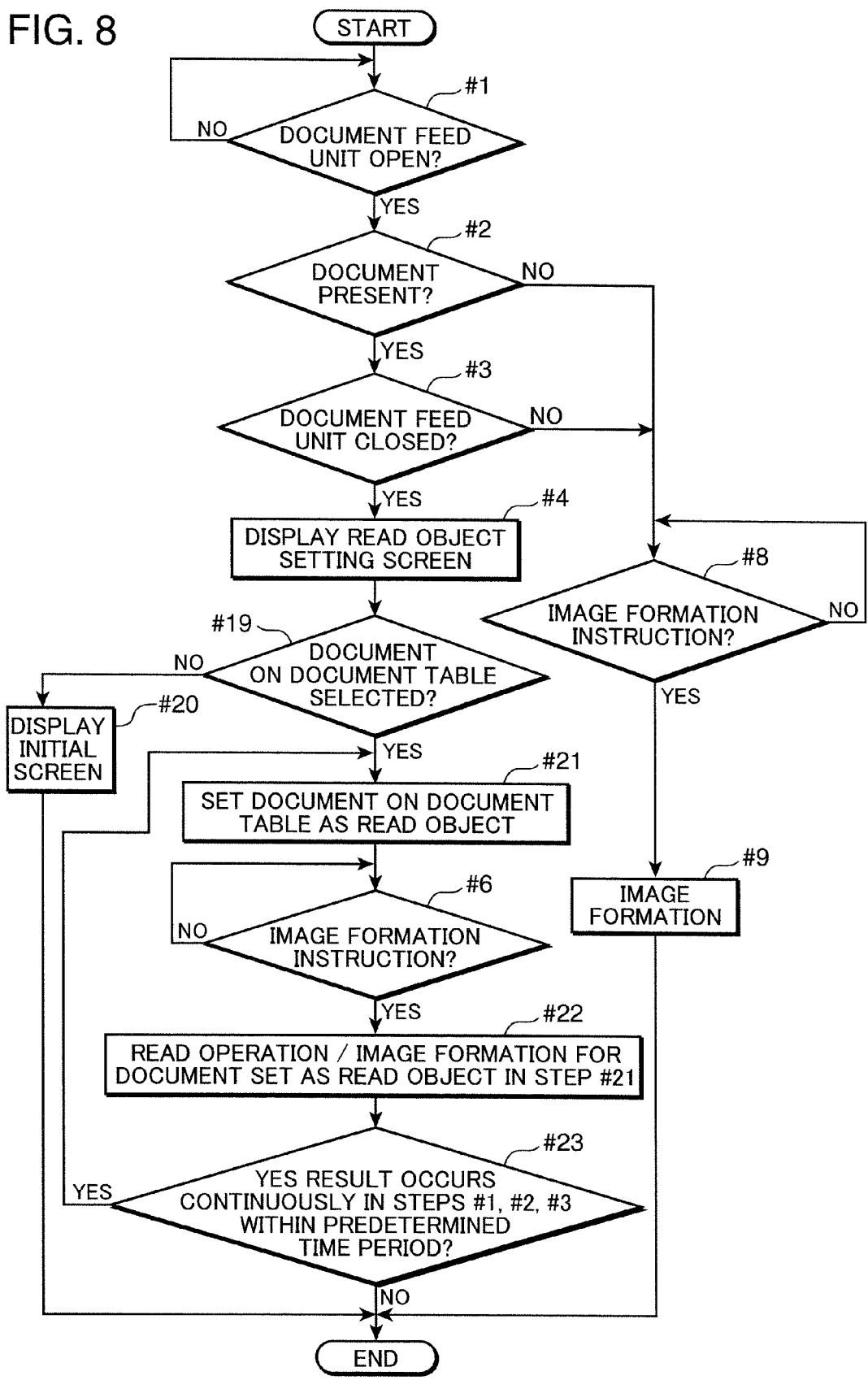
FIG. 8 is a flowchart showing a reading process of the control unit in relation to the characteristic feature (2) of a second modification example.

(2) If the attitude detection unit has detected the second attitude followed by the first attitude as the attitude of the document feed unit 5, in a state where the document presence/absence detection unit is detecting that a document is placed on the document placement section 9 of the document feed unit 5, within a predetermined time period after the operation of the respective units including the document reading unit 4 in the first control mode by the operation control unit, then the input acceptance unit 324 does not accept a selection input and the operation control unit sets the document placed on the document table 7 as the current read object. FIG. 8 is a flowchart for describing the characteristic feature (2). Steps which are the same as the steps described in FIG. 7 are labeled with the same reference numerals and description thereof is omitted. If the results YES at step #1, YES at step #2 and YES at step #3 occur consecutively within a predetermined period of time after step #22, in other words, if the document feed unit 5 has been opened, a subsequent document has been placed on the document table 7, and the document feed unit 5 has been closed (YES at step #23), then the control unit 32 carries out processing for returning to step #21. The reading control unit 325 then executes the processing in step #21. On the other hand, if the result is NO at step #23, then the reading process of the control unit 32 according to the second modification example terminates.

According to characteristic feature (2), if a selection for setting the document placed on the document table 7 is set in the selection input, and the user continues (in other words, within a predetermined period of time) by placing a subsequent document on the document table 7 and reading the document, then even if a document has been placed on the document placement section 9 of the document feed unit 5, the document placed on the document table 7 is set automatically as the current read object. Consequently, when a subsequent document is set on the document table 7 and the document is read, the read object setting screen G is not displayed and therefore the selection input can be omitted.

The composition of the characteristic features (1) and (2) can also be applied to the embodiment.

This application is based on Japanese Patent application serial No. 2009-227055 filed in Japan Patent Office on Sep. 30, 2009, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An image reading apparatus, comprising:
   a document table on which a document is placed;
   a document reading unit which reads an image of a document;
   a document feed unit which has a document placement section on which a document subjected to a reading operation by the document reading unit is placed, the document feeding unit being rotatable between a first posture for sandwiching the document between the document placement surface of the document table and the document feed unit, and a second posture rotated away from the document placement surface of the document table;
   a posture detection unit which detects whether the document feed unit is in the first posture or the second posture;
   a document presence/absence detection unit which detects whether or not a document has been placed on the document placement section of the document feed unit;
   an operation control unit which has a first control mode for controlling the operation of respective units including the document reading unit in order to read an image of a document placed on the document placement surface of the document table, and a second control mode for controlling the operation of respective units including the document reading unit in order to read an image of a document placed on the document placement section of the document feed unit; and
   an input acceptance unit which accepts a setting input for setting, as a read object document, either a document placed on the document placement surface of the document table or a document placed on the document placement section of the document feed unit when postures of the document feed unit are detected in the sequence of the second posture followed by the first posture by the posture detection unit, in a state where detection is made by the document presence/absence detection unit that a document is placed on the document placement section of the document feed unit,
   wherein the operation control unit sets the document placed on the document placement surface of the document table as a current read object, when the input acceptance unit accepts an input indicating that the document placed on the document placement surface of the document table is to be set as a read object document.

2. The image reading apparatus according to claim 1, further comprising:
   a display unit which displays a request screen for requesting a setting input for setting, as a read object document, either a document placed on the document placement surface of the document table or a document placed on the document placement section of the document feed unit when postures of the document feed unit are detected in the sequence of the second posture followed by the first posture by the posture detection unit, in a state where detection is made by the document presence/absence detection unit that the document is placed on the document placement section of the document feed unit,
   wherein the input acceptance unit accepts setting of a document placed on the document placement surface of the document table, or setting of a document placed on the document placement section of the document feed unit, as a read object document, by operation of the request screen.

3. An image reading apparatus, comprising:
   a document table on which a document is placed;
   a document reading unit which reads an image of a document;
   a document feed unit which has a document placement section on which a document subjected to a reading operation by the document reading unit is placed, the document feed unit being rotatable between a first posture for sandwiching the document between the document placement surface of the document table and the document feed unit by rotating the document feed unit to close the document feed unit, and a second posture rotated away from the document placement surface of the document table;
   a posture detection unit which detects whether the document feed unit is in the first posture or the second posture;
   a document presence/absence detection unit which detects whether or not a document has been placed on the document placement section of the document feed unit;
   an operating unit for inputting an instruction for the execution of a read operation by the document reading unit; and
   an operation control unit having a first control mode for controlling the operation of respective units including the document reading unit in order to read an image of a document placed on the document placement surface of the document table, and a second control mode for controlling the operation of respective units including the document reading unit in order to read an image of a document placed on the document placement section of the document feed unit,
   wherein the operation control unit sets as a current read object a document placed on the document placement surface of the document table when postures of the document feed unit are detected in the sequence of the second posture followed by the first posture by the posture detection unit, in a state where detection is made by the document presence/absence detection unit that a document is placed on the document placement section of the document feed unit, and when input of the execution instruction is accepted by the operating unit, the operation control unit controls the operation of the respective units including the document reading unit in the first control mode, and causes the document placed on the document placement section of the document feed unit to be output to a prescribed output position.

4. An image reading apparatus, comprising:
   a document table on which a document is placed;
   a document reading unit which reads an image of a document;
   a document feed unit which has a document placement section on which a document subjected to a reading operation by the document reading unit is placed, the document feed unit being rotatable between a first posture for sandwiching a document between the document table and the document feed unit, and a second posture rotated away from the document table;
   a posture detection unit which detects whether the document feed unit is in the first posture or the second posture;
   a document presence/absence detection unit which detects whether or not a document has been placed on the document placement section of the document feed unit;
   an operation control unit having a first control mode for controlling the operation of respective units including the document reading unit in order to read an image of a document placed on the document table, and a second control mode for controlling the operation of respective units including the document reading unit in order to read an image of a document placed on the document placement section of the document feed unit; and an input acceptance unit which accepts a selection input indicating whether or not to set a document placed on the document table as a read object document, when postures of the document feed unit have been detected in the sequence of the second posture followed by the first posture by the posture detection unit, in a state where detection is made by the document presence/absence detection unit that a document is placed on the document placement section of the document feed unit, wherein the operation control unit sets a document placed on the document table as a current read object, when the input acceptance unit accepts a selection input indicating that the document placed on the document table is to be set as a read object document.

5. The image reading apparatus according to claim 4, further comprising:

an operating unit for inputting an instruction for the execution of a read operation by the document reading unit, wherein the operation control unit controls the operation of respective units including the document reading unit in a first control mode, when input of the execution instruction is accepted by the operating unit after a document placed on the document table has been set as the current read object.

6. The image reading apparatus according to claim 5, wherein the operation control unit outputs the document placed on the document placement section of the document feed unit to a prescribed output position, when input of the execution instruction is accepted by the operating unit after the document placed on the document table has been set as the current read object.

7. The image reading apparatus according to claim 6, wherein the selection input sets either a document placed on the document table or a document placed on the document placement section of the document feed unit as the read object document.

8. An image forming apparatus, comprising:

the image reading apparatus according to claim 4; and an image formation unit which forms an image on paper on the basis of image data read by the image reading apparatus.

9. The image reading apparatus according to claim 5, wherein the input acceptance unit does not accept the selection input and the operation control unit sets a document placed on the document table as the current read object, when postures of the document feed unit are detected in the sequence of the second posture followed by the first posture by the posture detection unit, in a state where detection is made by the document presence/absence detection unit that a document is placed on the document placement section of the document feed unit, within a predetermined period of time after the operation of respective units including the document reading unit has been controlled in the first control mode by the operation control unit.

10. The image reading apparatus according to claim 9, wherein the selection input sets either a document placed on the document table or a document placed on the document placement section of the document feed unit as the read object document.

* * * * *